April 26, 1960 A. C. McWILLIAMS 2,933,809

INTERCHANGEABLE CUTTER HEAD DRY SHAVER

Filed Sept. 23, 1957 4 Sheets-Sheet 1

*INVENTOR.*
ARTHUR C. McWILLIAMS
*BY*
Richard L. Lindberg
ATTORNEYS

April 26, 1960 A. C. McWILLIAMS 2,933,809

INTERCHANGEABLE CUTTER HEAD DRY SHAVER

Filed Sept. 23, 1957 4 Sheets-Sheet 2

INVENTOR.
ARTHUR C. McWILLIAMS
BY
ATTORNEYS

INVENTOR.
ARTHUR C. McWILLIAMS
BY
Richard E. Lindberg
ATTORNEYS

April 26, 1960 A. C. McWILLIAMS 2,933,809

INTERCHANGEABLE CUTTER HEAD DRY SHAVER

Filed Sept. 23, 1957 4 Sheets-Sheet 4

INVENTOR.
ARTHUR C. McWILLIAMS
BY
Richard Lindberg
ATTORNEYS 2,933,809

INTERCHANGEABLE CUTTER HEAD DRY SHAVER

Arthur C. McWilliams, Evanston, Ill.

Application September 23, 1957, Serial No. 685,611

1 Claim. (Cl. 30—41.5)

This invention relates generally to shavers using improved cutter heads and to a construction whereby the cutter head may readily be converted for use with a face shaver employing suction against the cutter head, or for the type having vibrating shearing means for both coarse and fine hair removal.

It has been proposed to provide a dry shaver adapted for use with interchangeable cutting heads, one cutting head having a rotary action and the other cutting head having a translatory cutting action of the cutting elements. The rotary cutting action may be had with a cutter head having a foraminous shearing comb together with means for creating suction through the shearing comb to aid in moving the face hairs to a proper position for cutting. The vibrating type of shearing head is indicated for use on the head, neck, arms and legs, similar to those used by barbers. Electric barber shears are an example of the type particularly useful for trimming long hairs on the head, rather than for a close shave of face hairs.

According to the present invention means are provided whereby the rotary cutting head operates at slow speed of the order of two to three thousand r.p.m. for the cutter blades, and at a greatly higher speed of the order of sixteen to twenty thousand r.p.m. for suction means operating to pull the beard hairs into and through the openings of the shearing comb. The movement of air caused by the fan action also ejects the hair, after the shearing operation. The rotary cutting head for face shaving is provided with means whereby it can readily be removed from a housing enclosing the drive motor for the cutting head. Thus two types of hair cutters are provided for a single drive unit, the aforementioned heads being readily placed in position for either type of operation, there being no adjustment necessary to effect the use of either type of cutting head.

One object of this invention is to provide an improved hair cutter capable of operation with either a rotary or a vibratory type of cutter head.

Another object is to provide a hair cutter of the rotary type having means for driving the cutter blades at a low speed, and having means for providing adequate fan suction through the shearing comb and a secondary accompanying action that causes the removal of the hair cuttings, such secondary action being provided by fan blades driven at a high speed to provide suction to aid the shearing action of the cutter blades rotating at slow speed.

Still another object is to provide a hair cutter having a motor with high and low speed nested shafts, the high speed shaft being driveably connected to a fan providing suction means for a rotary cutter, and the low speed shaft being connected to shaver blades for either a rotary or vibrating cutter heads.

Another object of this invention relates to the so-called dry type hair cutting means whereby one power unit selectively operates one, two or more improved cutting heads, each being specially designed for cutting hairs on the face, head or legs, and being driven by a single power unit.

The improvements according to the present invention are illustrated by the accompanying drawings and may be tabulated as follows:

A—The provision of a face shaver with a high speed fan creating suction action against the skin, such that hairs protruding from the skin are caused to enter slots or openings of the cutter head or comb for effective shearing.

B—A secondary result from the operation of the high speed fan whereby the cut hairs or fine clippings are cleaned from the cutting head and widely dispersed.

C—The combination with the fan operating with a high motor speed of cutter blades operating at slow speed to allow sufficient lapsed time for the hairs to become positioned through the openings of the cutter head or comb, thereby resulting in efficient cutting operation.

D—The provision of high speed air movement through the openings in the cutter head whereby it will be cool at all times.

E—The provision of cutter heads each of which is efficient for removing hair on the face, head, legs, etc., for example, a rotating type of cutter head for the face, and a vibrating type of cutter for hairs of different diameters as they occur on head, legs, etc.

F—The provision of face type cutter head having a cutter comb constructed by selecting woven metal wire cloth of suitable gauge and mesh openings, and then compressing same to create a paper thin smooth surface with proper size openings for holding the hairs to be cut.

G—The provision of a construction which protects the cutter comb from damage and insures its rigid support, the cutting comb being held rigidly by plastic material in which it is embedded, and being supported additionally by radial rib members spanning the distance between inner and outer anchoring rims.

H—The provision of replaceable cutter blades mounted on spring type support members to cushion the cutting action of the blades should an opening in the comb contain a hard particle of skin or dirt.

I—The disposition of cutter blades and their mounting finger supports in such a position so as to secure both a chopping and a slicing cutter action.

J—The provision of means for properly spacing the cutters and comb in the head to reduce friction and wear, and at the same time capable of being firmly held in the adjusted position.

Other objects and important features of the invention will be apparent from the specification following taken with the drawings which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and purview of the subjoined claims.

Figure 1:
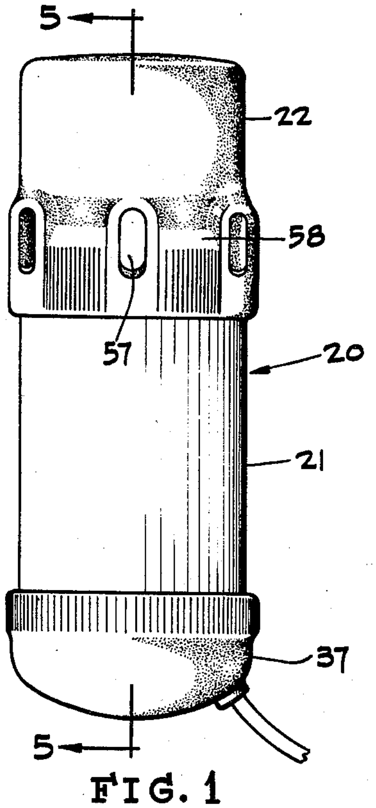
Fig. 1 is an elevational view of face shaver with a rotary cutting head, showing air vents for the cutting head, such shaver having the improvements according to one form of the present invention embodied therein.
Figure 5:
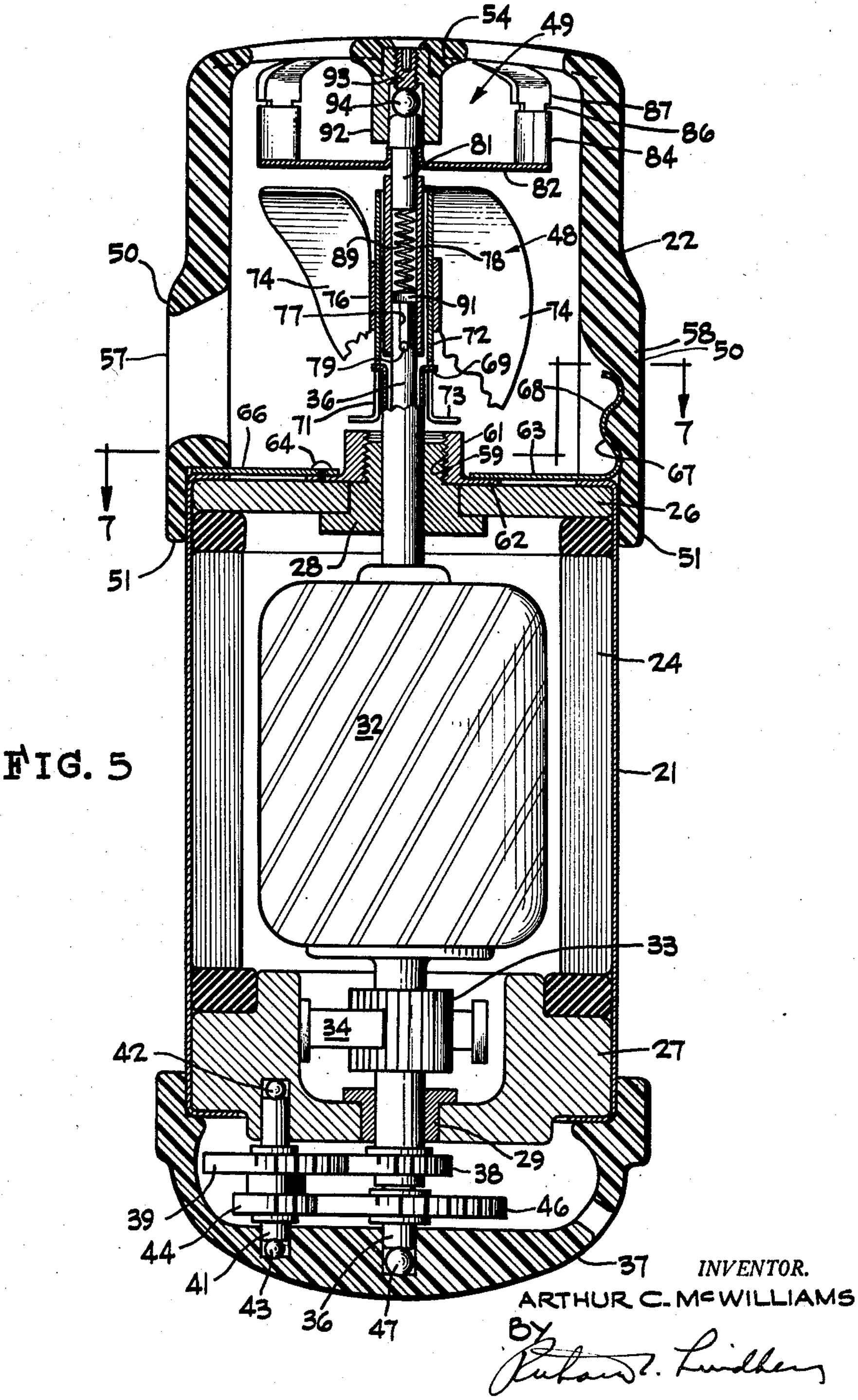
Fig. 5 is a vertical sectional view taken through the face shaver of Fig. 1 taken substantially along the line 5—5 of Fig. 1 looking in the direction of the arrows.
Figure 17:
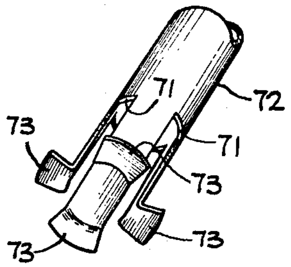
Figures 15, 16:
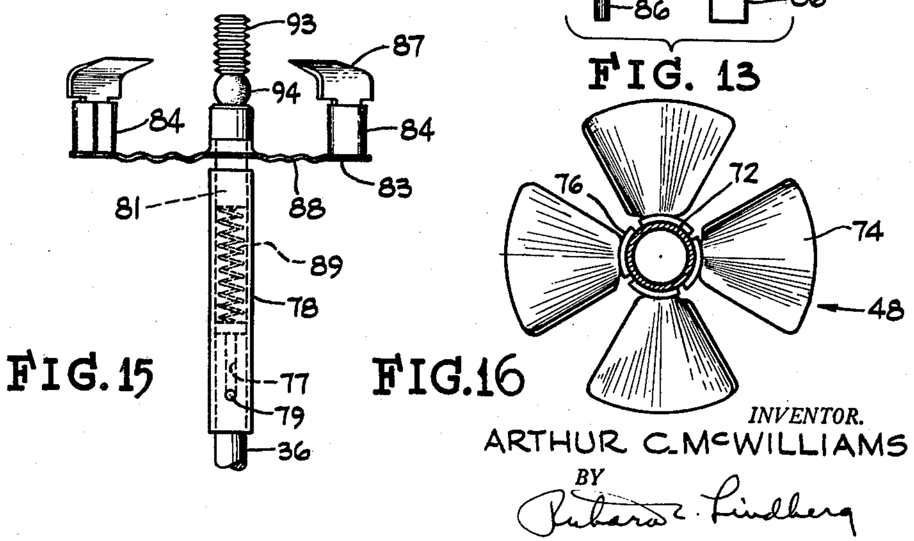

Fig. 15 is an elevational assembly view showing the flexible mounting of the cutter blades of the embodiment of the invention seen in Figs. 1 and 5, providing individual cushioning for each blade, and positive spring pressure exerted on cutter disk support of cutter fingers; and Fig. 16 is an end view showing the manner in which fan blades of the embodiment of Figs. 1 and 5 are driven by the motor drive quill shaft; and Fig. 17 is an isometric view of the hub supporting the fan blades.

Figure 2:
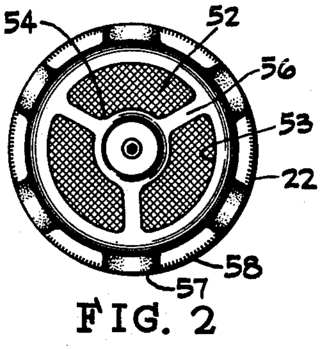
Fig. 2 is a top view thereof showing a cutter head formed of a wire screen embedded in a plastic molded material.
Figure 3:
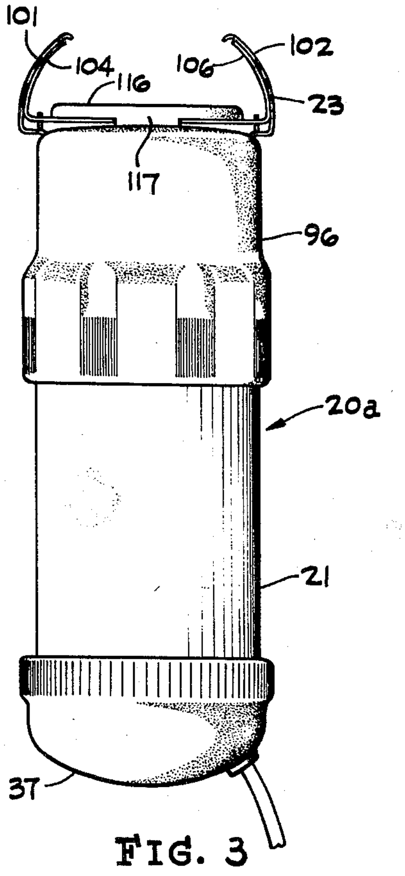
Fig. 3 is an elevational view of another form of the invention showing coarse and fine hair cutter combs employed with a vibrating type cutting head.

Referring now to the drawings, the hair cutter according to the embodiment of the present invention is referred to respectively by the reference numerals 20 and 20_a_. The embodiment shown in Fig. 1 is especially adapted for dry shaving of the face, while the embodiment shown in Fig. 3 is especially suited for trimming hair on the legs, arms, the neck, etc. Each of the embodiments seen in Figs. 1 and 3 includes a motor housing 21 as shown in Fig. 5. Motor housing 21 is arranged to have attached thereto a rotary type face hair cutting head 22 as seen in Figs. 2 and 5, or a vibrating type cutting head 23 as seen in Figs. 3, 4, 8, 9 and 14. Reference will be first had to the construction of the driving mechanism contained within the housing Fig. 5, particularly as it relates to the rotary type of face hair cutter of one embodiment of the invention, as seen generally with respect to Figs. 1, 2, 5, 11, 12, 15 and 16.

Referring now particularly to Fig. 5 of the drawings, the motor housing 21 provides a support for a field structure 24 and a pair of end closures 26 and 27. These respectively support bearing bushings 28 and 29, the two bushings affording a support for a quill shaft 31, see also Figs. 6 and 10, having a rotating armature 32 turning therewith and in the field structure 24. Quill shaft 31 also supports a commutator 33 cooperating with brushes 34 carried by the end closure 27.

Quill shaft 31 turns at the high speed of the armature, and is arranged to drive a nesting shaft 36 concentric therewith at a reduced speed. An end bell 37 secured to end closure 27 encloses a gear train made up of a small driving gear 38 on the end of the quill shaft protruding within the end bell 37 and mating with an idler gear 39 fast upon a shaft 41, journaled at 42 within the end closure 27 and at 43 within the end bell 37. Shaft 41 also has fast thereon a gear 44 meshing with a gear 46 fast on the nesting shaft 36, end thrusts against the nesting shaft 36 being taken by a ball 47 in the end bell 37.

The rotary cutter head encloses suction means indicated generally by the reference numeral 48 and driven by the quill shaft 31 at the high speed of the motor, details of which suction means will appear as this specification proceeds, and a rotary cutter 49 driven by the nesting shaft 36.

The rotary face hair cutting head 22 is generally in the form of a cup-shaped annulus 50 and has a flange 51 fitting over the end of the motor housing 21 remote from the end bell 37. The cup-shaped annulus 50 is made of plastic material and supports a circular foraminous shearing comb 52, see Fig. 2, having its outer periphery 53 embedded in an outer rim of annulus 50 and its inner periphery 54 embedded in an inner rim of annulus 50, the inner rim being connected to the outer rim of annulus 50 by radially extending bridging spokes 56, see also Fig. 2.

It may be noted that the annulus 50 may be molded of plastic of a high impact type. The annulus 50 has spaced ports 57 therein which alternate with ribs 58, the ports 57 educting the cuttings.

Figures 6, 10:
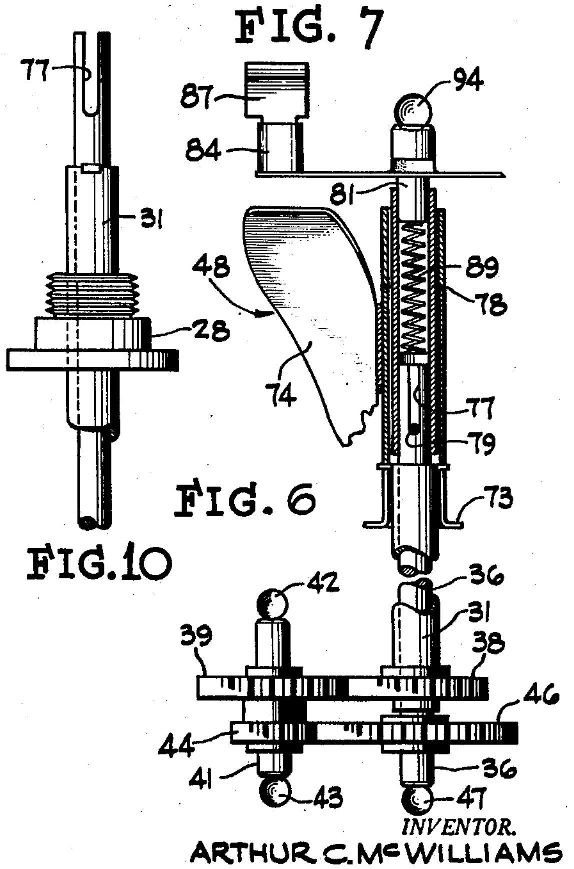
Fig. 6 is an elevational view also taken looking in the direction of the arrows 5—5 of Fig. 1, showing details of speed reduction drive and the mountings for the fan and cutter driven thereby.
Fig. 10 is an enlarged detail elevational view showing a quill shaft and its nested shaft, these shafts being employed in both the embodiments of Figs. 1 and 3.
Figure 11:
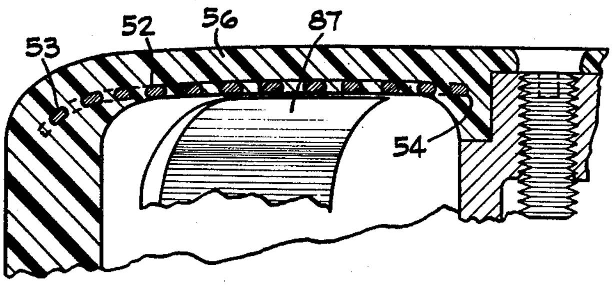
Fig. 11 is a transverse section to an enlarged scale through the cutter head of the embodiment seen in Figs. 1 and 5, showing the manner in which the foraminous shearing comb is embedded at its inner and outer peripheries.

As seen in Fig. 5, the motor bushing 28 is exteriorly threaded as at 59 to receive an interiorly threaded hub 61 having a flange 62 and a flexible metal spider 63 riveted thereto as at 64, see also Fig. 6. The spider 63 has arms 66 which fit into the flange 51, and upstanding fingers 67 contoured to match the surface 68 on the interior surface of the rib 58 between the openings 57.

The end of the quill shaft 31 extending within the cutter head 22 has a number of exterior diametral splines 69 which cooperate with slots 71 on a tubular shaft 72, see also Fig. 17. The bottom end of tubular shaft 72 has flange like splines 73 which mate with the diametral splines 69.

The tubular shaft 72, see Figs. 16 and 17, affords a support for a plurality of fan blades 74 having partial hubs 76 spotted to the outer bore of the shaft 72.

Nesting shaft 36 has a long diametral slot 77 in the end thereof extending within the rotary head 22. A hollow cylindrical shaft 78 surrounds the nesting shaft 36 and has a sliding fit thereon. The hollow shaft 78 has a diametral pin 79 extending across slot 77 whereby the hollow shaft 77 turns with the nesting shaft 36, hollow shaft 78 also turning within the tubular shaft 72 supporting the fan blades 74. The hollow shaft 78 is fast with a solid shaft 81 supporting a flexible spider 82.

Figure 12:
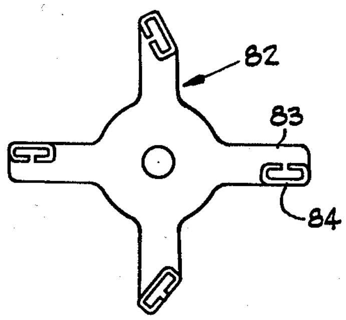
Fig. 12 is a plan view showing the supports for the cutter blades employed with the embodiment of the shaver of Figs. 1 and 3, and showing details whereby the cutter blades have both a slicing and chopping action.
Figure 13:
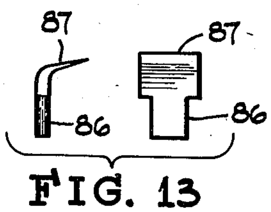
Fig. 13 shows details of the blades supported in the support of Fig. 12.

Flexible spider 82, see Fig. 12, has radially extending arms 83 with upstanding pockets 84 of rectangular cross section at the ends thereof. These are arranged to receive the tangs 86 of cutter elements 87, see Fig. 13. As seen in Fig. 12 two of the pockets are arranged normal to the path of rotating movement of the spider 82 so as to give a chopping action to the face hairs, while the two other pockets are inclined to the circular path of rotation so as to give a slicing or shearing action.

As seen in Fig. 15, the arms 83 may be corrugated as at 88 to give a certain amount of spring pressure against the foraminous shearing comb 52.

The foraminous shearing comb 52 may be formed of woven screen wire compressed to paper thinness with a solid smooth surface having openings reduced to proper size for hair cutting. It will be noted that this process adds both strength and hardness to the structure as well as furnishing a finished product that has the appearance of a solid structure. When the wire cloth is compressed to the desired openings and moulded in place it can be suitably ground or lapped to a fine cutting surface.

A spring 89 is bottomed against a stop 91 in contact with the end of the nesting shaft 36, and is bottomed at its other end against the solid shaft 81, the spring 89 causing the cutter elements 87 to be desirably spaced from the foraminous shearing comb 52.

Means are provided for adjusting the pressure of the cutter elements 87 against the shearing comb 52, and to this end the upper end of the shaft 81 is guided within a bushing 92 molded integrally with the inner rim of the annulus 50. A socket head set screw 93 is tapped into the bushing 92, and is urged against a ball 94 in turn in contact with the end of the shaft 81. The socket head screw 93 is turned to selected positions to adjust the cutter elements 87 with respect to the shearing comb 52.

Figure 7:
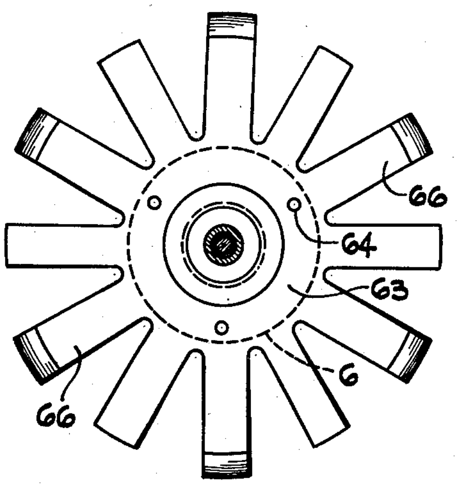
Fig. 7 is a plan view of a snap-in holding ring for the cutter head seen in Fig. 5, said view being taken in the direction of the arrows 7—7 of Fig. 5.
Figure 8:
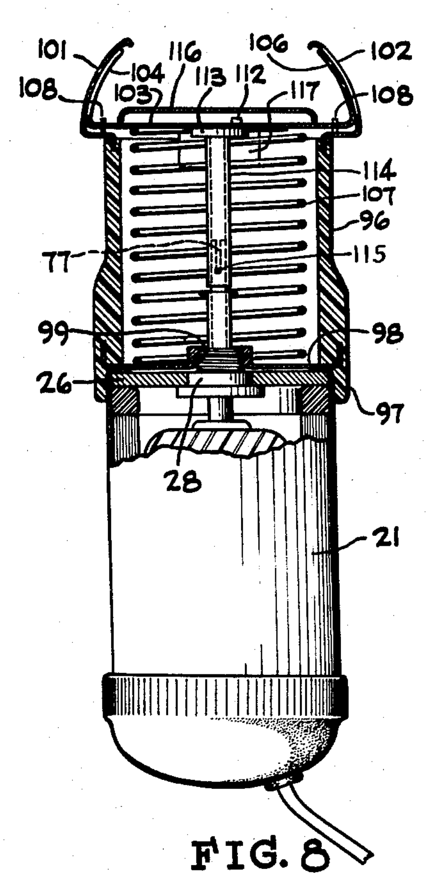
Fig. 8 is a vertical section view taken through the embodiment of the invention seen in Fig. 3 showing details of the hair cutter when provided with vibrating cutters for fine and coarse hairs.

The entire cutter head 22 together with the suction means 48 and the rotary cutter 49 can be removed as a compact unit from the housing 21 by removably threading same at the threaded bushing 28. Upon the completion of such operation the quill shaft 31 and its nesting shaft 36 will be exposed as seen in Fig. 10. The working parts can then be separately disassembled by first removing the spider 63 seen in Fig. 7 from its position in the cup shaped member 50. Thereafter, the fan 48 can be removed from around hollow shaft 78, and then shaft 78 and cutter 49.

At all times during operation, the quill shaft 31 turns at the motor speed, and the nesting shaft 36 turns at a speed appropriate to the economical cutting action which requires a slow speed to allow time for hairs to enter openings in foraminous shearing comb 52. Greatly higher speed of the fan blades is required to produce sufficient suction, and this is obtained by the quill shaft 31. The face hairs are thus positioned through the openings in the cutting head.

Referring now to Figs. 3, 4, 8, 9 and 14 of the drawings, there is shown an added embodiment of the invention indicated by the reference numeral **20*a* whereby a vibrating type of cutter head 23 can be fitted to the housing 21 interchangeably with the rotary type of cutter head previously described. As seen particularly in Fig. 8, the vibrating type of cutter is composed of a sleeve like cutter housing 96 having an annular flange 97 embracing one end of the housing 21. A closure disk 98 is threaded as at 99 to the fixed bushing 28 seen also in Fig. 5. The closure disk 98 has an upturned outer flange embedded in the cutter housing 96**.

Figure 9:
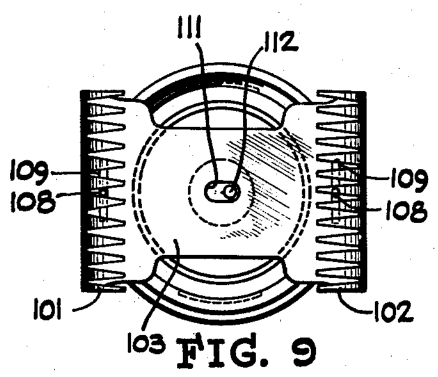
Fig. 9 is a top view similar to Fig. 4 showing the vibrating cutters for the vibrating head.
Figure 14:
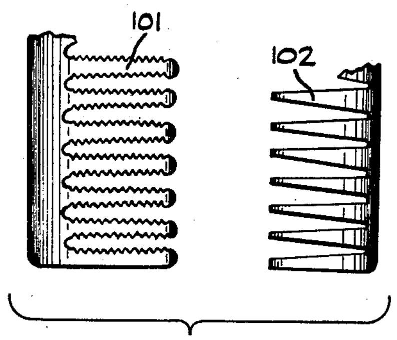
Fig. 14 is a plan view showing different combs employed for cutting fine and coarse hair, such combs being employed with the embodiment of Fig. 3.

The end of the housing 96 remote from the flange 97 has embedded therein a pair of fixed shearing combs 101 and 102, see also Figs. 9 and 14, one of which may be for coarse hair cutting as on the head and the other of which may be for fine cutting as on legs or underarms. The two fixed shearing combs 101 and 102 cooperate with a vibrating cutter 103 having cutters 104 and 106 in contact with the inner faces of the fixed combs 101 and 102.

Means are provided for urging the vibrating cutter 103 into contact with the fixed combs 101 and 102, and to this end a coiled spring 107 has one end bottomed against the underside of the moving cutter 103 and its other end against the disk 98. Each of the stationary combs 101 and 102 has an upstanding guide 108 extending through a guide slot 109 in vibrating cutter 103, see also Fig. 9.

Means are provided for oscillating the moving cutter 103 to and fro with respect to the stationary combs 101 and 102. To this end the cutter 103 has a generally elliptical shaped slot 111 therein cooperating with an eccentrically mounted pin 112 upstanding from a circular bearing plate 113. Bearing plate 113 is fast with a hollow shaft 114 extending over the nested shaft 36, the end of the hollow shaft 114 being fitted with a diametral pin 115 engaged within the slot 77 of the nested shaft 36.

It will be noted that the quill shaft 31 is free to turn within the housing 96 whilst the nested shaft drives the shaft 114 and the eccentric 112, the eccentric 112 and the slot 111, cooperating to move the cutters 104 and 106 with respect to their respective fixed shearing combs 101 and 102.

Figure 4:
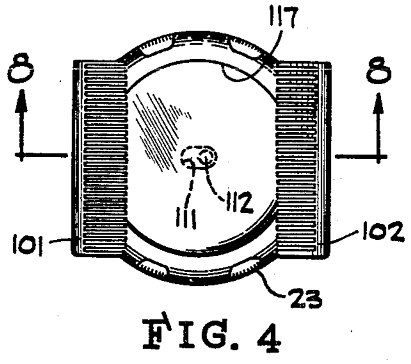
Fig. 4 is a top view thereof.

The eccentric 112 and the moving cutter 103 and the interior of the cutter housing 96 are enclosed against the entrance of hair cuttings by means of a circular cover plate 116 having a cutout annular flange 117 pressed into the housing 98, see Fig. 4.

From the description foregoing it is evident that there has been provided a new and useful improvement in hair cutters, the improvement being characterized by interchangeable cutting heads, one such cutting head being of the rotary type and the other being of the vibrating type. In the rotary type it may be noted that the cutter blades and the suction means are driven at speeds for optimum operation, the speed of the shaft for driving the cutting elements being so low as to greatly reduce and minimize friction of moving parts, and the speed of the suction means being such as to insure a large volume of air to raise the face hairs and to cause them to enter openings in the foraminous comb for removal.

The vibrating shearing type of head is adapted to being used with the same motor driving means as employed by the rotating face cutter, a nested shaft being employed for driving both vibrating and rotating type heads, the two hair cutter heads being readily interchangeable.

While the invention has been described in terms of a number of preferred embodiments thereof its scope is intended to be limited only by the claim here appended.

I claim as my invention:

In a dry shaver, a motor housing and a motor armature turning therein, a quill shaft supporting said motor armature, a shaft nested within said quill shaft, said quill and said nested shafts extending beyond said housing, a gear train mounted at the other end of said housing and adapted to cause rotation of said nested shaft at a speed whch is less than the speed of said quill shaft, a cutter head adapted to be detachably secured to said motor housing, said cutter head having a shearing comb disposed in one end thereof, a rotatable cutter having a plurality of cutter elements thereon adapted to cooperate with said shearing comb and adapted to rotate with respect to said shearing comb including a cutter shaft supporting said rotatable cutter and journaled in said cutter head, suction means including a plurality of fan blades mounted on a second quill shaft, at least one opening in the side of said cutter head for discharging cuttings moving through said shearing comb, said second quill shaft surrounding said cutter shaft, and means affording a separable connection between said first and second quill shaft and said nested and cutter shafts.

References Cited in the file of this patent

UNITED STATES PATENTS

| | | |
|---|---|---|
| 646,190 | Parker | Mar. 27, 1900 |
| 1,921,893 | Steele | Aug. 8, 1933 |
| 2,119,021 | Moskovics et al. | May 31, 1938 |
| 2,167,833 | Gold | Aug. 1, 1939 |
| 2,281,789 | Moskovics | May 5, 1942 |
| 2,308,920 | Horowitz et al. | Jan. 19, 1943 |
| 2,499,249 | Jay | Feb. 28, 1950 |
| 2,541,189 | Barsch | Feb. 13, 1951 |
| 2,575,741 | Abrams et al. | Nov. 20, 1951 |
| 2,618,055 | Robertson | Nov. 18, 1952 |
| 2,677,884 | Richard | May 11, 1954 |
| 2,795,042 | Ritchey et al. | June 11, 1957 |
| 2,802,260 | Allen | Aug. 13, 1957 |